United States Patent [19]
Lee et al.

[11] Patent Number: 5,151,945
[45] Date of Patent: Sep. 29, 1992

[54] DETERMINATION OF AMBIENT LIGHT LEVEL CHANGES IN VISUAL IMAGES

[75] Inventors: George C. Lee, Williamsville, N.Y.; Xianyi Sun, Beijing, Taiwan

[73] Assignee: The Research Foundation of State Univ. of N.Y., Albany, N.Y.

[21] Appl. No.: 580,629

[22] Filed: Sep. 11, 1990

[51] Int. Cl.$^5$ .............................................. G06K 9/00
[52] U.S. Cl. .......................................... 382/1; 382/37; 382/4; 358/105
[58] Field of Search ................... 382/1, 4, 2, 37, 38, 382/39, 42; 358/105, 108, 109, 101

[56] References Cited

U.S. PATENT DOCUMENTS

| | | | |
|---|---|---|---|
| 4,337,481 | 6/1982 | Mick et al. | 358/105 |
| 4,408,224 | 10/1983 | Yoshida | 358/108 |
| 4,455,550 | 6/1984 | Iguchi | 340/525 |
| 4,679,077 | 7/1987 | Yuasa et al. | 358/108 |
| 4,737,847 | 4/1988 | Araki et al. | 358/108 |

Primary Examiner—Michael Razavi

[57] ABSTRACT

A visual image comparison method is provided, including the steps of: obtaining a first digital representation of a first visual image, where the first digital representation comprises a first plurality of pixels, and each pixel has a gray scale indicative of light intensity; obtaining a second digital representation of a second visual image, where the second digital representation comprises a second plurality of pixels, and each pixel has a gray scale indicative of light intensity; and selectively making a first predetermined number of comparisons of corresponding pixels from the first and second digital representations to determine whether a difference in ambient light intensity exists between the first and second visual images, and, selectively making a second predetermined number of comparisons of corresponding pixels from the first and second digital representations if and only if no difference in ambient light intensity exists between the first and second visual images, and indicating an alarm condition when a percentage of the second predetermined number of comparisons result in pixels having a difference in gray scale of a predetermined amount. Apparatus is also described for the purpose of implementing the method.

3 Claims, 7 Drawing Sheets

Microfiche Appendix Included
(1 Microfiche, 21 Pages)

DETERMINATION OF AMBIENT LIGHT LEVEL CHANGES IN VISUAL IMAGES

In accordance with 37 C.F.R. 1.96, a microfiche appendix is to be considered a portion of the entire "written description" of this invention in conformance with 35 U.S.C. 112. The appendix includes one microfiche having 21 data frames.

BACKGROUND OF THE INVENTION

The present invention relates generally to video surveillance methods and apparatus and, more particularly, to automatic surveillance systems which detect changes in a field of view over time and indicate an alarm condition accordingly.

The use of video cameras at remote locations for surveillance by video monitors is well known. In some circumstances, constant human supervision or monitoring is required. A typical example of this manual surveillance method would be the remote placement of cameras in a retail store to detect shoplifting; another example would be a camera in a bank activated during working hours to monitor a robbery attempt. Many security systems typically employ a plurality of video cameras situated throughout a facility, with a central monitoring location where a human guard keeps watch. These manual systems are predecessors within the field of the present invention.

Human interaction in surveillance is extremely expensive. In some circumstances, then, it is economical and desirable to replace the human observer with an automatic surveillance system, or at least to alleviate the guard from the burden of constant supervision, freeing him to perform other useful work. Automatic surveillance systems have evolved, therefore, to handle situations which do not require constant human supervision. An example of this application would be the monitoring of an empty room at night, where an automatic system would sense the entry of an intruder and sound an alarm. It may be desired to monitor an outdoor parking lot, or perhaps the entrance or exit of a building. Other applications include monitoring products or workpieces on an assembly line, etc. In a multitude of applications, automatic surveillance methods and systems are more economical and even more reliable than systems requiring constant human interaction.

A common problem encountered by all automatic surveillance systems, both indoor and outdoor, involves false alarms triggered by changes in ambient light intensity. For example, in monitoring an outdoor scene such as a parking lot, a cloud passing overhead may substantially affect ambient light conditions and trigger a false alarm. Even in indoor applications, many offices employ automatic light dimming circuits which dim the lights in the evening, causing problems for automatic surveillance systems.

Attempts to solve the false triggering problem are well documented in the art. One well-known technique involves the use of automatic exposure lenses or cameras to compensate for ambient light intensity variations. Unfortunately, this method is limited to only small variations in intensity. Another alleged solution is proposed by Yoshida in U.S. Pat. No. 4,408,224 (Oct. 4, 1983). Yoshida broadly discloses a surveillance method which includes the comparison of two digitized video image signals taken of a "place scenery" at different points in time. To solve the problem caused by changes in ambient light, Yoshida suggests displacing the capturing of the two video images in time by an amount which is negligible with respect to the ambient changes in brightness. For example, Yoshida suggests that displacing the capture of the images by 15 seconds to 1 minute is suitable to overcome the effects of gradually changing brightness. Unfortunately, this attempt to solve the problem is limited in its usefulness in that it is dependent upon the rate of change of the ambient light intensity. While one time setting may be suitable for slowly changing intensity levels (such as might occur at sunset, dawn, etc.), this same time setting may be unsuitable for rapid changes (such as clouds passing overhead during a thunderstorm, or sudden dimming of lights in an office, etc.).

What is needed, then, is a surveillance system which is not only immune to false alarms caused by changes in ambient light conditions, but also functions independently of the speed with which these ambient changes occur.

SUMMARY OF THE INVENTION

A visual image comparison method is provided, including the steps of obtaining a first digital representation of a first visual image, where the first digital representation comprises a first matrix having a plurality of pixels, and each pixel has a gray scale value indicative of light intensity; obtaining a second digital representation of a second visual image, where the second digital representation comprises a second matrix having a plurality of pixels, and each pixel has a gray scale value indicative of light intensity; and selectively making a first predetermined number of comparisons of corresponding pixels from the first and second digital representations to determine whether a difference in ambient light intensity exists between the first and second visual images, and, selectively making a second predetermined number of comparisons of corresponding pixels from the first and second digital representations if and only if no difference in ambient light intensity exists between the first and second visual images, and indicating an alarm condition when a percentage of the second predetermined number of comparisons result in pixels having a difference in gray scale of a predetermined amount. The first and second visual images can be images obtained at different locations simultaneously, images taken of a single location at different times, or images obtained at different locations at different times. An apparatus is also provided to implement the method of the invention.

A primary object of the invention is to provide a visual image comparison method which functions independently of ambient changes in light intensity between the visual images being compared.

A secondary object is to provide a visual image comparison method which functions independently of the time rate of change of ambient light intensity between a first and second visual image being compared.

DETAILED DESCRIPTION OF THE INVENTION

The present invention is a visual image comparison system which enables automatic surveillance of a location over time, or simultaneous monitoring of two or more identical or nearly identical objects. The system described herein may be used in homes, museums, stores, offices, and other commercial establishments as well as in hotels, airports, and other special places requiring security measures. The invention may also find applications in industry such as, for example, the monitoring of a workpiece on an assembly line. In addition to security surveillance applications, the system may also be used to compare two visual images (fingerprints, etc.) simultaneously to determine if the images are the same or nearly the same.

The system is used in conjunction with a video camera or other means of providing an analog visual image. A visual image comparator method and apparatus analyzes the analog visual images and sounds an alarm if a sufficient difference exists between two different images.

Figure 1A:
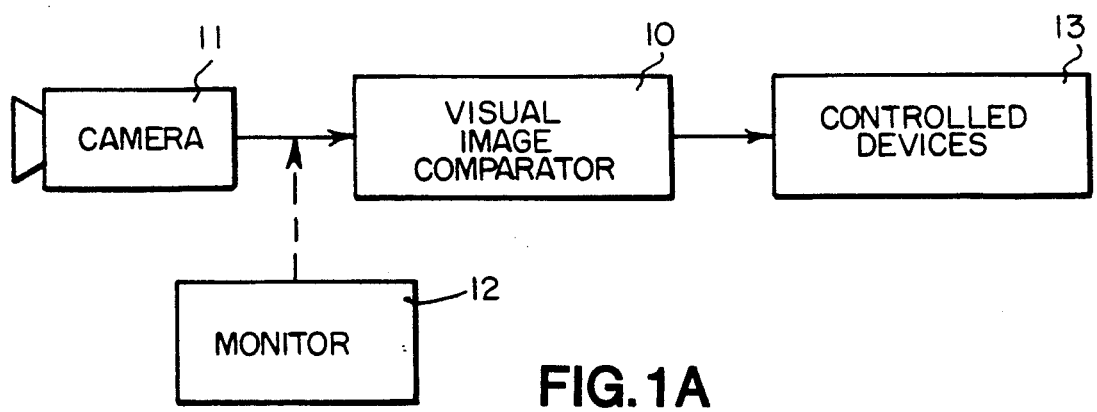
FIG. 1A is a general block diagram of a video surveillance apparatus which utilizes the present invention.

The apparatus of the invention is outlined in block form in FIG. 1A to show how the invention interacts with auxiliary equipment. Visual image comparator (VIC) 10 represents the present invention, which operates on visual images provided by video camera 11 or, alternatively, by optional video monitor 12. When a change in non-ambient light intensity or when motion occurs within the field of view of camera 11 (or within monitor 12), VIC 10 signals an alarm, represented by controlled devices 13 in FIG. 1A. Controlled devices 13 may be any device capable of indicating an alarm (bell, whistle, buzzer, light, etc.) or it may even comprise a video monitor which automatically displays the changing video image when a change occurs. For example, in one application contemplated by the inventors, a video camera is focused on the entrance to a residence. As someone approaches the entrance, the motion is detected by the system. The system may be programmed to display the video camera image on a television set (or to display the image as a "picture-within-a-picture" on the television) to indicate the arrival of a visitor. When the television set is turned off, the system may be programmed to turn on lights or sound audible alarms, etc. (or to turn the television on to display the changing video image). In yet another application, the camera might be focused on an infant's crib to monitor the baby at sleep. If the infant awakens, moves or becomes distressed, the parents can be alerted accordingly.

Figure 1B:
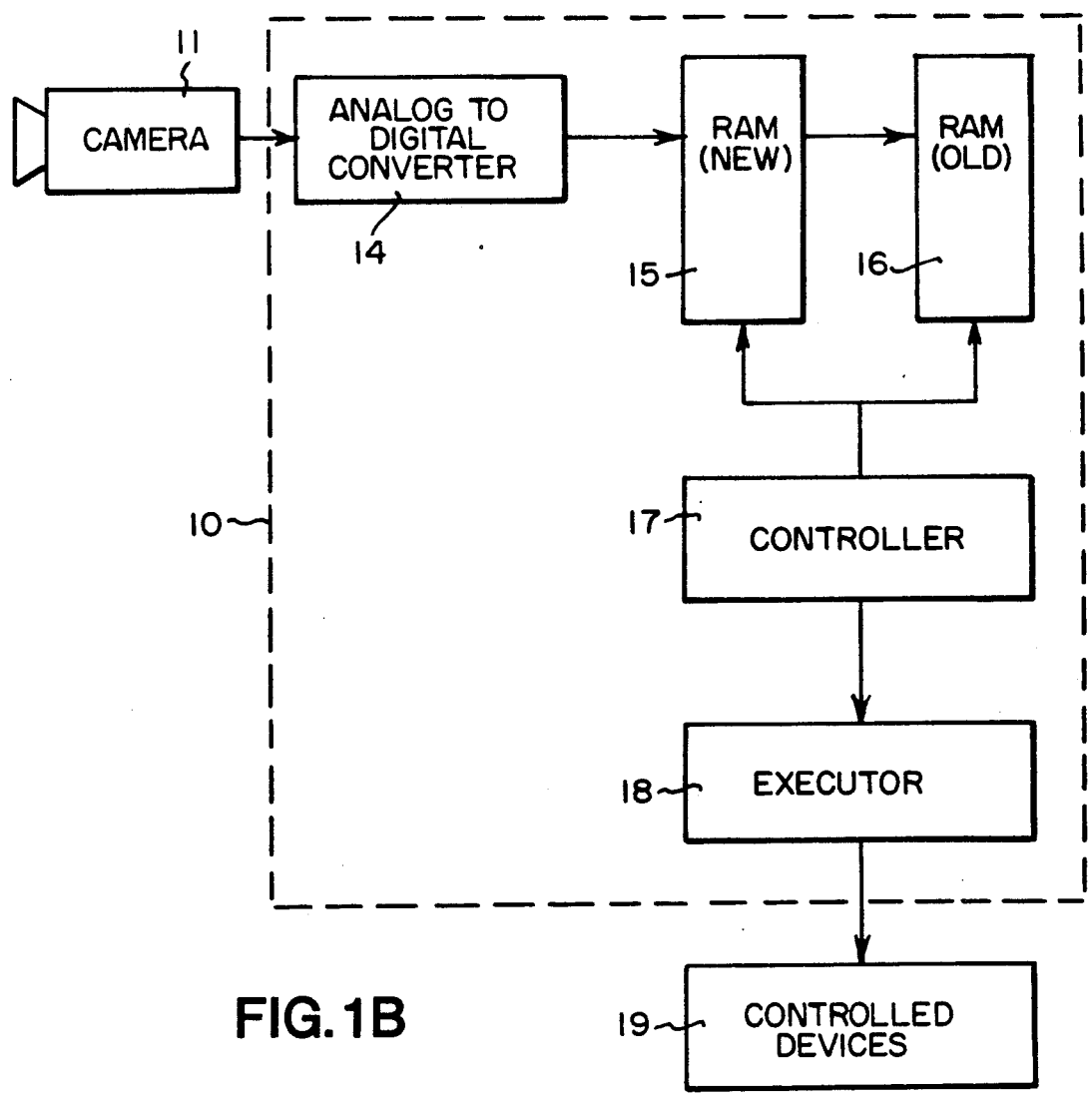
FIG. 1B is a general block diagram similar to FIG. 1A but expanded to show the major elements of the visual image comparator.

A preferred embodiment of the invention which shows VIC 10 in more detail is shown conceptually in FIG. 1B. VIC 10 includes A/D converter 14, $RAM_{(NEW)}$ 15, $RAM_{(OLD)}$ 16, controller 17 and executor 18. A/D converter 14 converts the analog video signal provided by camera 14 into digitized signals. The digital representation of a first visual image so obtained is then stored in $RAM_{(NEW)}$ 15, which is a random access memory. At a subsequent instant in time, a new image signal is obtained. The digital representation stored in $RAM_{(NEW)}$ 15 is transferred to $RAM_{(OLD)}$ 16, and the new digital image is stored in $RAM_{(NEW)}$ 15. Controller 17 controls the transferring of the old image from $RAM_{(NEW)}$ 15 to $RAM_{(OLD)}$ 16 and then compares the old and new images. If a sufficient difference exists between the images, controller 17 sends an alarm signal to executor 18. Executor 18 activates various auxiliary alarm devices as discussed previously.

In the preferred embodiment depicted in FIG. 1B, both the old and new digitally represented images are stored in separate memories prior to comparison. It should be readily apparent, however, that it is also possible to compare temporally displaced images by only storing the earlier image in memory and then comparing a present or new image to the old in real time, eliminating the need for one of the memories. It is also possible to compare two distinct images simultaneously received by two video cameras at the same time, eliminating both memories. For example, one camera could be focused on an image (such as a fingerprint) while a second camera scans other images looking for a match. An inverter circuit connected to controller 17 or executor 18 would sound an alarm only when a match is found. Similarly, on an assembly line, one camera could be focused on a static image of a workpiece as it should appear at a certain step in assembly, while a second camera is timed to monitor workpieces on the actual assembly line. If the two images don't match, a suitable warning would be given to indicate a possible product defect.

Adverting once again to the preferred embodiment depicted in FIG. 1B, it should be noted that VIC 10 may be implemented in apparatus form in one of at least two ways. In a first embodiment, VIC 10 may comprise software run by a conventional computer such as an IBM PC® or compatible computer. In a second embodiment, VIC 10 may comprise a dedicated circuit specially designed to implement the method of the invention. In either case, the method of comparison is the same, and this method is described herebelow:

The Visual Image Comparison Method

The present invention broadly comprises a visual image comparison method, comprising the steps of: obtaining a first digital representation of a first visual image comprising a first plurality of pixels, where each pixel has a gray scale indicative of light intensity; obtaining a second digital representation of a second visual image comprising a second plurality of pixels, where each pixel has a gray scale indicative of light intensity; selectively making a first predetermined number of comparisons of corresponding pixels from the first and second digital representations to determine whether a difference in ambient light intensity exists between the first and second visual images, and, selectively making a second predetermined number of comparisons of corresponding pixels from the first and second digital representations if and only if no difference in ambient light intensity exists between the first and second visual images, and indicating an alarm condition when a percentage of the second predetermined number of comparisons result in pixels having a difference in gray scale of a predetermined amount.

Figure 2:
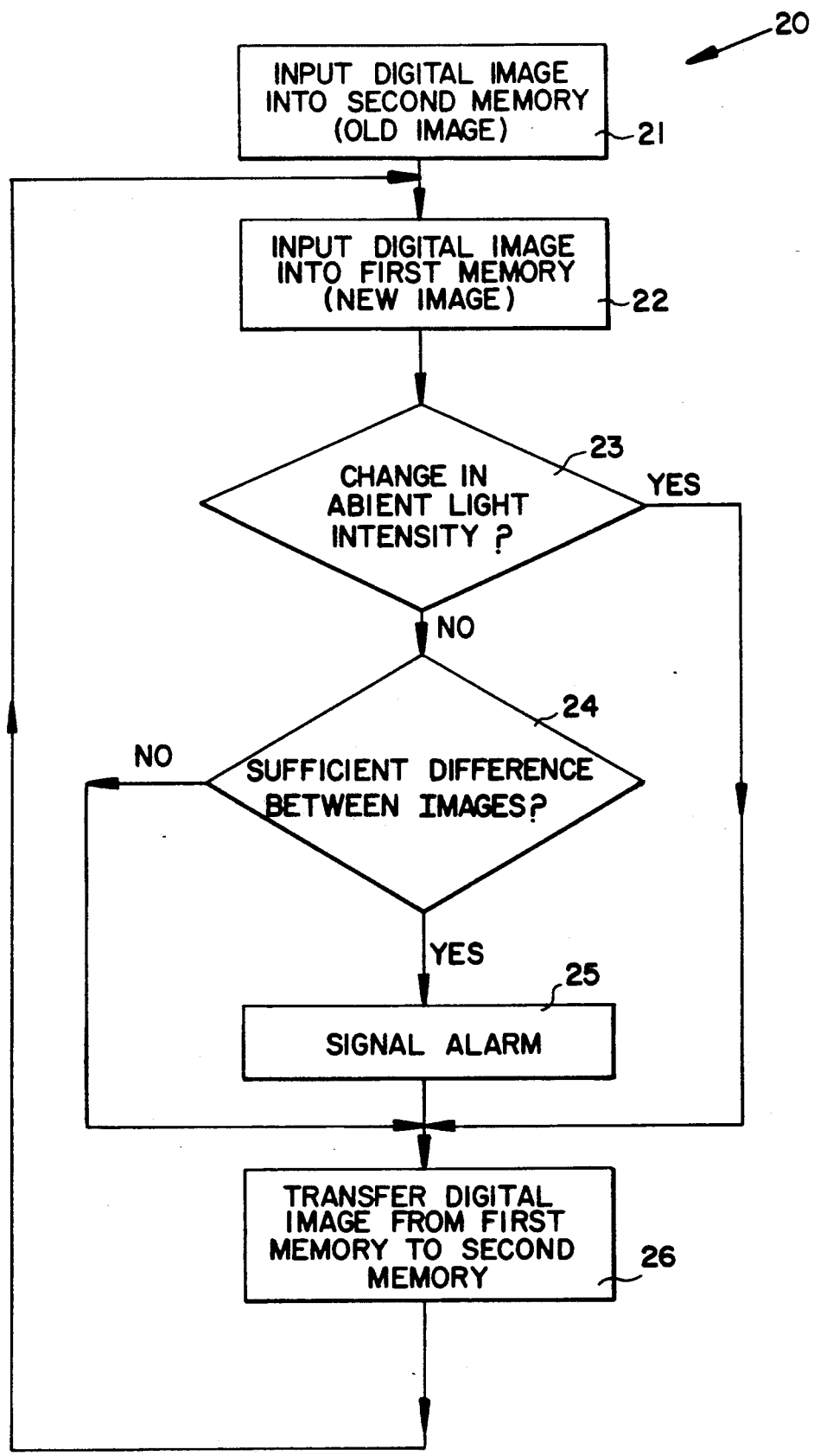
FIG. 2 is a flow diagram illustrating the general method of the invention.

FIG. 2 illustrates by flow diagram the general method of the invention. To begin the process, it is assumed that a frame of digitized data representative of a second visual image is already stored in a second memory (box 21). A new image is then digitized and a new frame of digitized data is stored in a first memory (box 22). The new and old digital representations of first and second visual images, respectively, are then compared (box 23). A decision is made as to whether a difference in ambient light intensity exists between the two images. Such a difference would occur, for example, if the sun suddenly disappeared behind a cloud; if a tree branch was moved by the wind in front of the camera lens; at sunset or sunrise, or if the lights in a room were turned on or off, etc. In other words, such a change would likely be distributed somewhat throughout the entire visual field. The essence of the invention is to distinguish between such ambient intensity changes, and other changes, such as might be caused by someone or something entering or leaving the visual field. The invention will indicate an alarm condition for the latter condition, but will not sound a false alarm for the former condition.

If an ambient intensity difference is found to exist in box 23, control is passed to box 26, where the digital image previously stored in the first memory is transferred to the second memory (and the image previously stored in the second memory is erased). The method then proceeds back to box 22 where a new image is obtained and stored and the process repeated.

If, on the other hand, no ambient intensity change or difference is detected, control passes directly to box 24, where a second comparison is done between the first and second visual images. If a sufficient difference exists between the two images, an alarm is indicated (box 25). Otherwise, control passes to box 26 and the process repeats as described above.

It is the unique method used to compare old and new images which enables the present invention to operate independently of changes in ambient light intensity. This comparison is best understood with reference to FIGS. 3A and 3B.

Figure 3A:
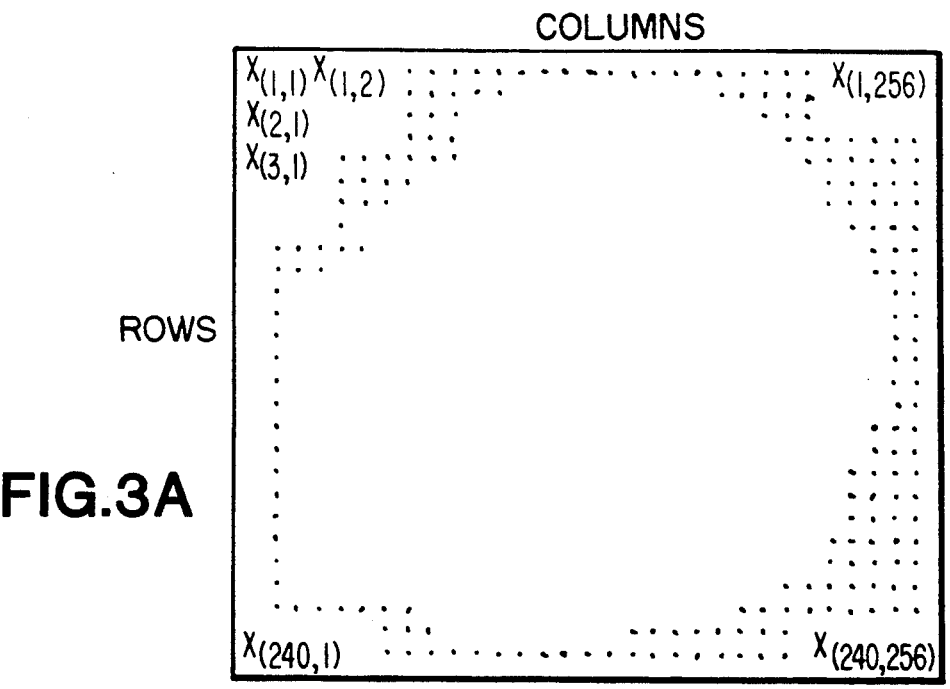
FIG. 3A represents a first digital representation of a first visual image.

FIG. 3A represents a first digital representation of a first visual image. The representation comprises a plurality of pixels $X_{(1,1)}, X_{(1,2)}, X_{(1,3)}, \ldots, X_{(240,256)}$, where each pixel has an associated gray scale indicative of brightness or light intensity. For example, an individual pixel may have a gray scale, G, ranging from 0 to 63, where 0 indicates black and 63 indicates white, or from 0 to 255, where 0 indicates black and 255 indicates white depending on the interface board used.

Figure 3B:
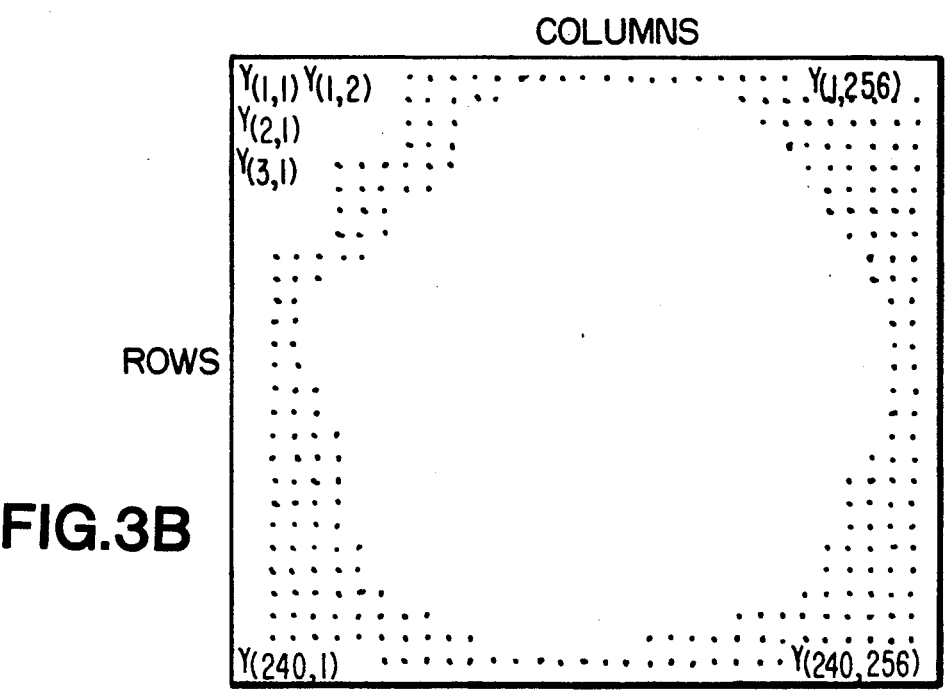
FIG. 3B represents a second digital representation of a second visual image, which two images are compared by the present invention.
Figure 4A:
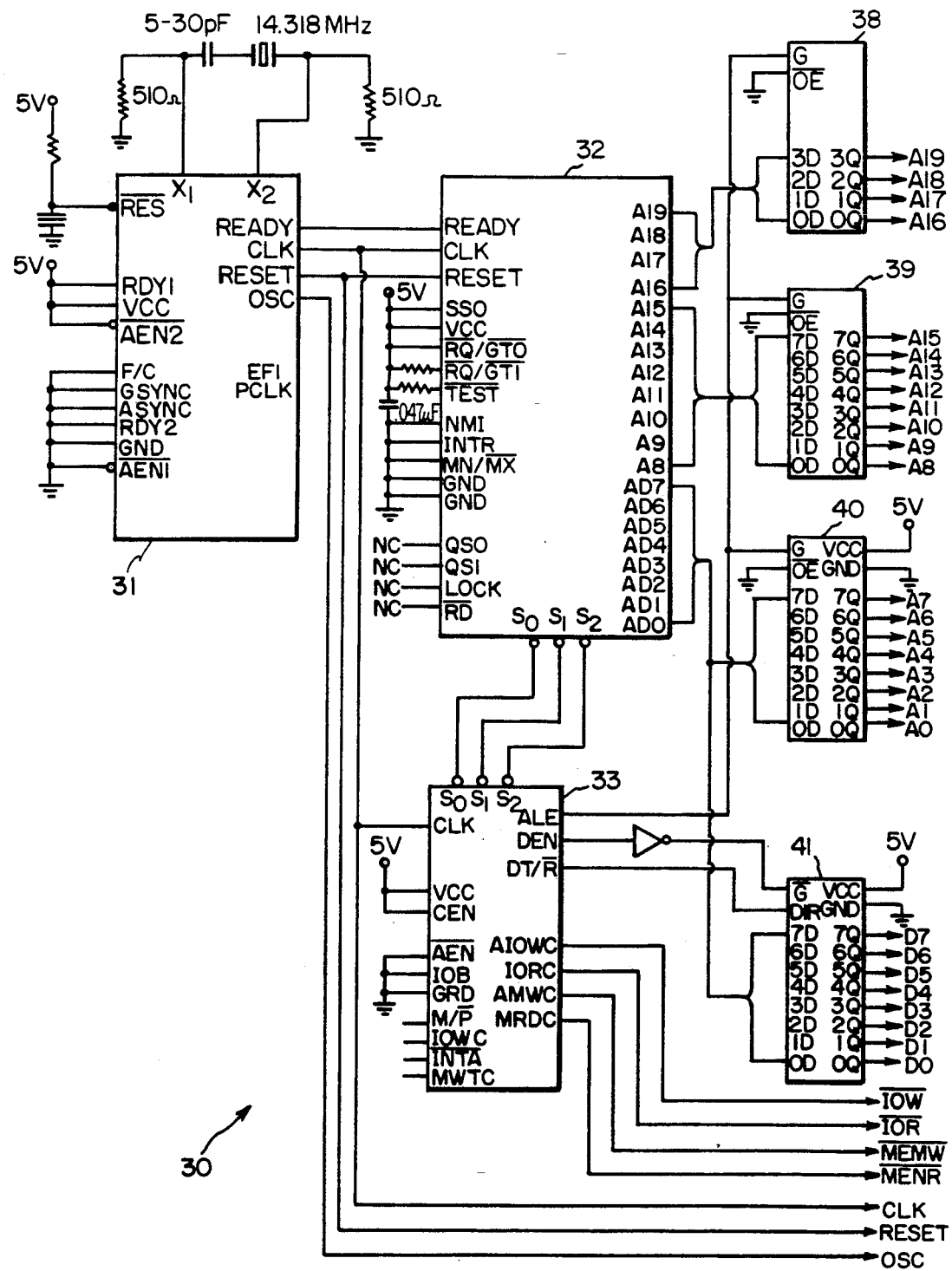
FIGS. 4A-4E illustrate a schematic circuit diagram of an alternative embodiment of the invention which utilizes a dedicated "hard" circuit.
Figure 4B:
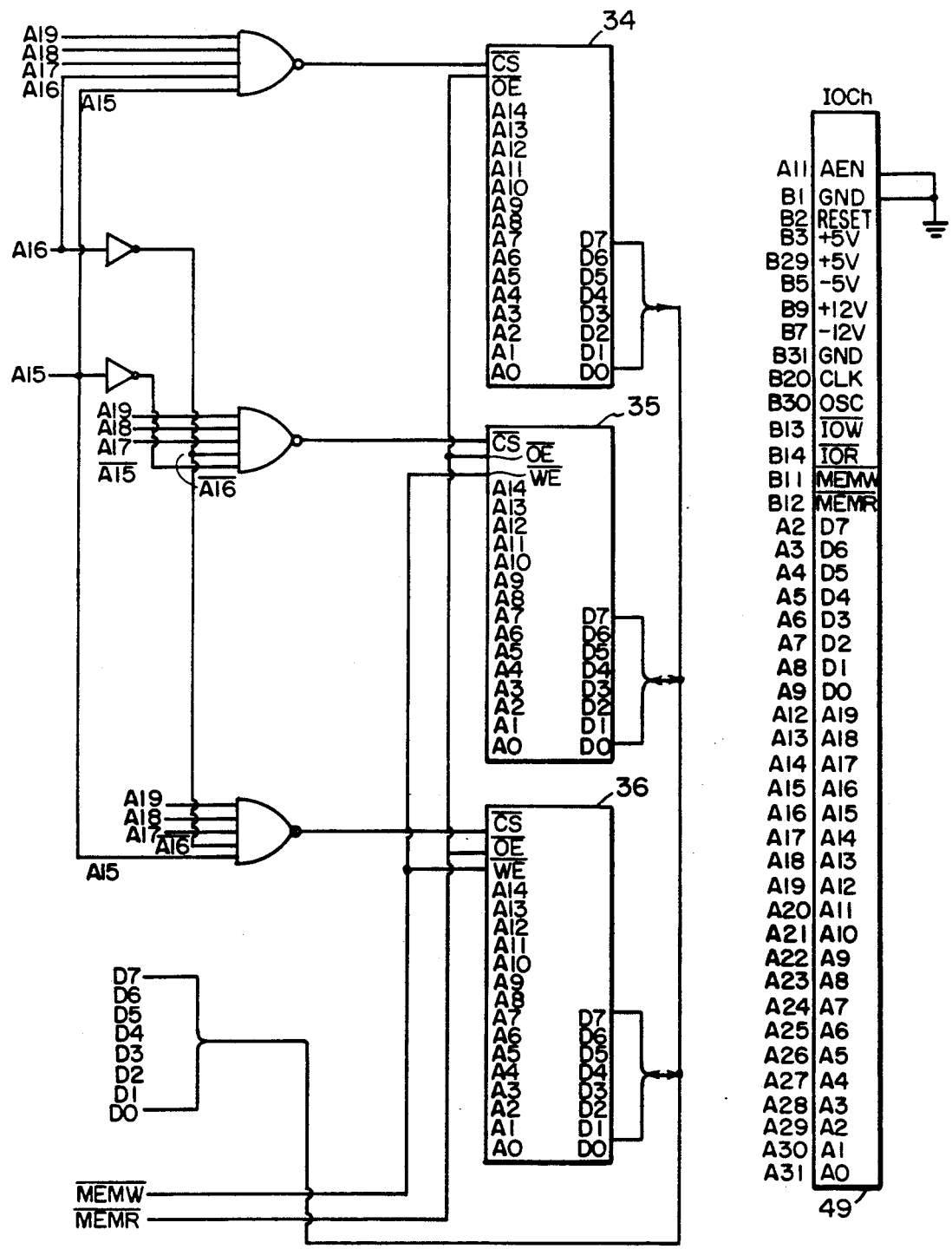
Figure 4C:
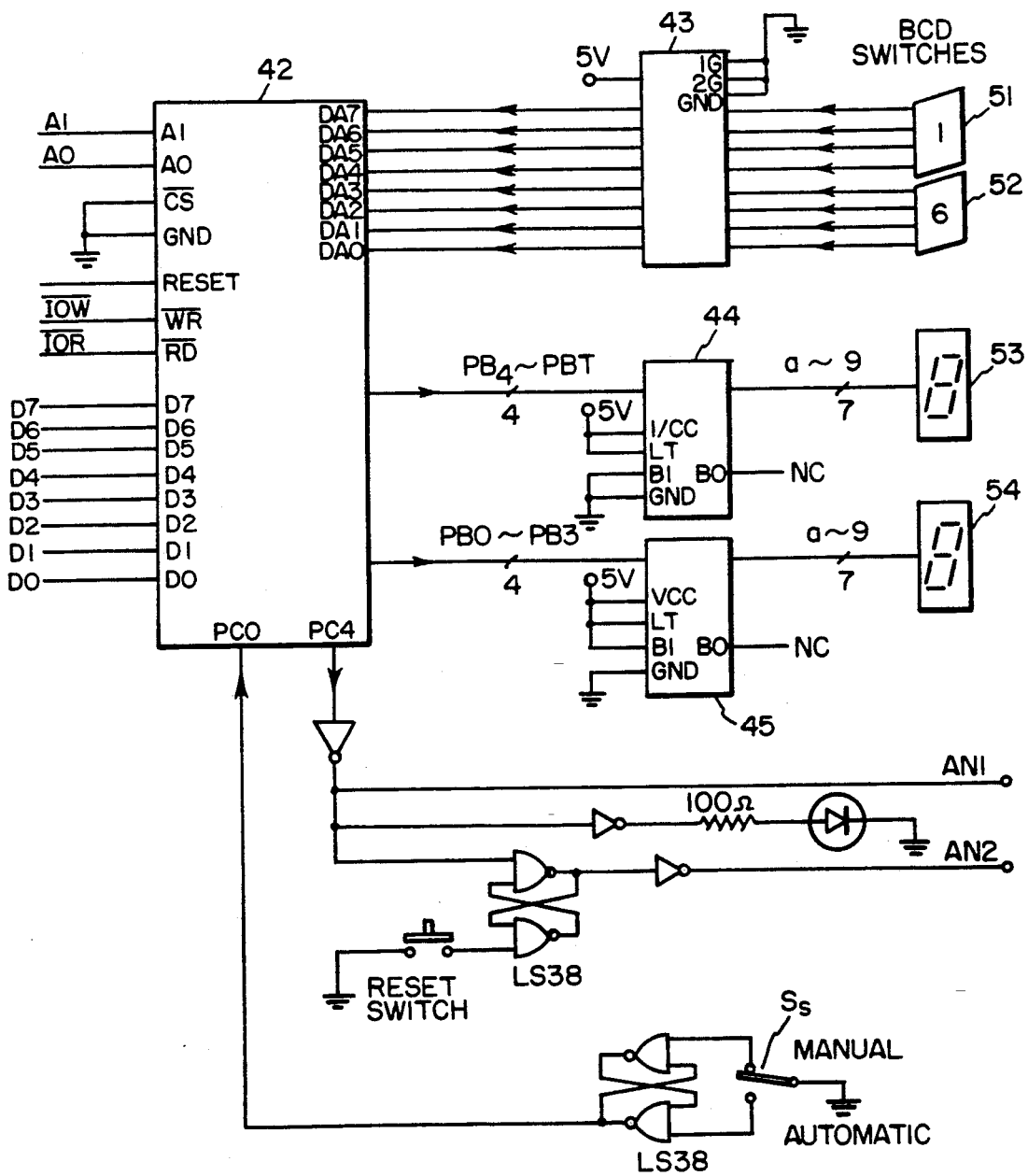
Figure 4D:
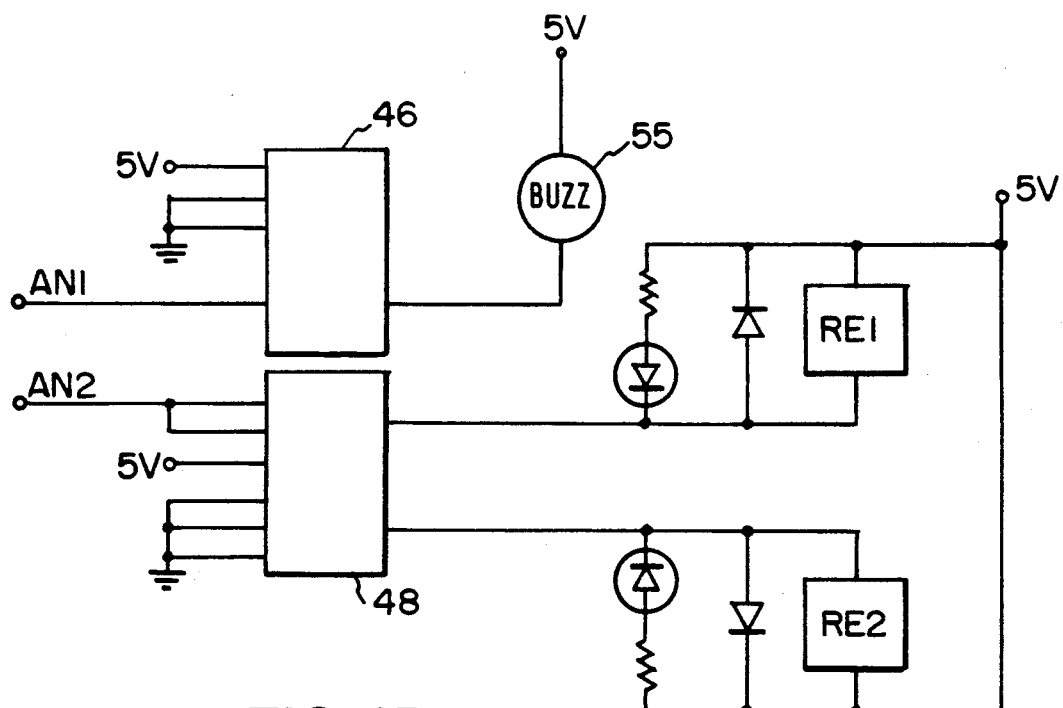
Figure 4E:
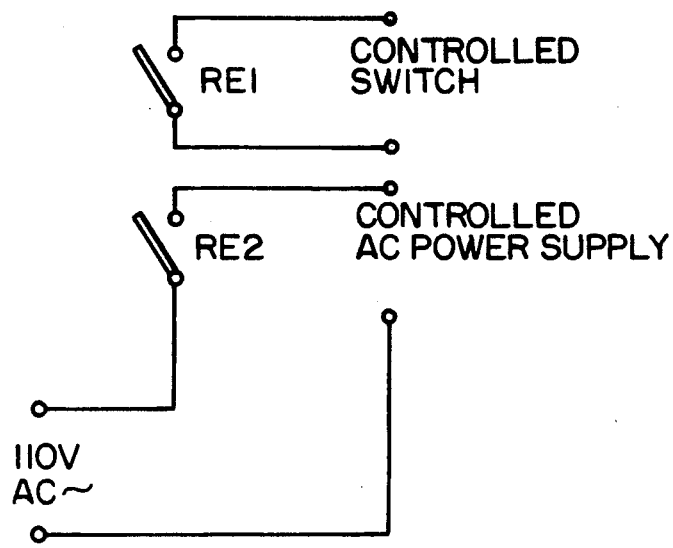

Similarly, FIG. 3B represents a second digital representation of a second visual image, such as that of an image obtained at a later point in time than the first image mentioned previously. The second representation comprises a plurality of pixels $Y_{(1,1)}, Y_{(1,2)}, Y_{(1,3)}, \ldots, Y_{(240,256)}$, where each pixel has an associated gray scale as discussed above.

The comparison method of the invention functions by comparing digital representations of corresponding pixels of the first and second images. For example, $X_{(3,1)}$ and $Y_{(3,1)}$ are corresponding pixels. There are three variables which factor into the comparison process as follows:

1. The total number of comparisons of corresponding pixels from each image. (Determined by J, the number of pixels to jump over when making comparisons from each image).
2. The number of comparisons, N, which must yield a difference in gray scale in order to signify an alarm condition.
3. The magnitude, K, of the gray scale difference necessary within a given pixel-pair to signify an alarm condition.

It can be readily appreciated that a comparison of each pixel of the first image with its corresponding pixel of the second image would be extremely time consuming if all 61,440 pixels of each image were compared. Obviously, comparison processing time is related to the number of pixels compared. For example, in a software-driven embodiment of the invention, a comparison of 20,480 pixels (skipping every third pixel) takes approximately 0.71 seconds of processing time, whereas comparing 8,777 pixels (skipping every seventh pixel) takes approximately 0.43 seconds.

Fortunately, it is unnecessary to compare each and every pixel to achieve a system which functions independently of changes in ambient light intensity. Moreover, the number of comparisons needed, the percentage of those comparisons which must show a difference, the spatial distribution of the pixels compared, and the magnitude of the gray difference between pixels being compared are variables dependent upon whether the comparison is being done to determine a change in ambient light intensity, or to determine an alarm condition.

The first comparison of the method determines whether a difference in ambient light intensity exists between the first and second visual images. In a preferred embodiment, experiments indicate that, for an image comprising 61,440 pixels, as few as 1,536 pixels need be compared (skipping every 40th pixel, i.e., J=40) and yet still achieve accurate and reliable results. In other words, it is only necessary to compare approximately 2% to about 4% of the total image, assuming that the compared pixels are distributed throughout the image. Of course, more pixels could be compared, but this would increase processing time. The processing time required to compare 1,536 pixels is less than 0.3 seconds.

Experiments also indicate that, for J=25-40, N may be in the approximate range of N=90-110 to achieve accurate results. In other words, approximately 3% to about 8% of the compared pixel-pairs must exceed the predetermined K value (magnitude of gray difference) in order to indicate a difference in ambient light intensity.

Finally, in making the ambient light comparison, experiments indicate that a low K value is preferred (e.g., K=2 or 3) since the change in ambient light may be very small. This is the magnitude, K, of the gray scale difference within a given pixel-pair comparison necessary to signify an alarm condition. For example, if one pixel has a gray scale of 21 and its corresponding pixel has a gray scale of 27, then the gray scale difference is said to be 6 (27−21). The value of K selected affects the sensitivity of the system. The lower the value of K, the more sensitive the system. In a system such as the preferred embodiment where each pixel has a gray scale range from 0 to 63, a K value of 2 to 3 is a difference equivalent to 3%-5% of the total gray scale.

Once again, experimental data suggest that values of K=2 or 3 ensure reliable operation in nearly all ambient light conditions. This is not to say that other values of K will not be suitable, only that values of K=2 or 3 are preferred. In fact, other values of K have been proven to achieve suitable results, depending upon the ambient light conditions. Obviously, the method will still work satisfactorily with larger K values, but will simply be less sensitive to changes in ambient light intensity.

Also, it is noted that, in a preferred embodiment, the pixels compared are uniformly distributed throughout the images (i.e., every 25th pixel, every 40th pixel, etc.). This is not to imply that uniform distribution is absolutely necessary, although it is preferred. In checking for ambient light differences, it is necessary, however, that compared pixels be distributed widely throughout the images.

Summarizing, then, in a preferred embodiment, the first comparison to determine if a difference in ambient light intensity exists between the first and second images is preferably made with K=2 or 3, N=90-110, and J=25-40. These ranges are intended to be guidelines and approximations, and it is not intended or implied that other combinations of J, K and N will not work satisfactorily, only that satisfactory results have been obtained when the variables are selected within these ranges.

In the second comparison, or so-called common surveillance mode, a different range of the variables are utilized to determine if an alarm condition exists. It has been determined experimentally that N=2 or 3 achieves satisfactory results when J=3-7. While other values of N may also work, it has been found that N=1 often results in false alarms, and high values of N result in low surveillance sensitivities which may not detect small moving objects within the visual field. Similarly, although larger values of J may work satisfactorily, as J increases small moving objects may not be detected.

In a preferred embodiment, the K value in the second comparison is determined by the average gray scale value of the ambient (AGA) according to Table I below. The average gray scale value of the ambient is determined by adding all of the individual gray scales values (G's) of each considered pixel and then dividing this total by the number of pixels considered.

TABLE I

| AGA | 1  | 2  | 3  | 4  | 5  | 6  | 7  | 8  | 9  | 10 |
|-----|----|----|----|----|----|----|----|----|----|----|
| K   | 1  | 2  | 4  | 7  | 9  | 12 | 14 | 16 | 16 | 16 |
| AGA | 11 | 12 | 13 | 14 | 15 | 16 | 17 | 18 | 19 | 20 |
| K   | 16 | 16 | 16 | 16 | 16 | 16 | 17 | 17 | 17 | 17 |
| AGA | 21 | 22 | 23 | 24 | 25 | 26 | 27 | 28 | 29 | 30 |
| K   | 18 | 18 | 18 | 18 | 18 | 19 | 19 | 19 | 19 | 19 |
| AGA | 31 | 32 | 33 | 34 | 35 | 36 | 37 | 38 | 39 | 40 |
| K   | 20 | 20 | 20 | 20 | 21 | 21 | 21 | 22 | 22 | 22 |
| AGA | 41 | 42 | 43 | 44 | 45 | 46 | 47 | 48 | 49 | 50 |
| K   | 23 | 23 | 23 | 24 | 24 | 24 | 24 | 25 | 25 | 25 |
| AGA | 51 | 52 | 53 | 54 | 55 | 56 | 57 | 58 | 59 | 60 |
| K   | 26 | 26 | 26 | 27 | 27 | 27 | 28 | 28 | 29 | 29 |
| AGA | 61 | 62 | 63 |    |    |    |    |    |    |    |
| K   | 30 | 31 | 32 |    |    |    |    |    |    |    |

Although K is determined automatically in the preferred embodiment, a less sophisticated embodiment is possible, where K is determined manually and by trial and error by the system operator. For example, if surveillance of an indoor room having a constant ambient light intensity is desired, the operator may manually set the sensitivity level and experiment with persons or objects moving in and out of the visual field until satisfactory results are obtained.

Obviously, increasing the number of pixels compared is one way of increasing the reliability of the system, but at the cost of increasing processing time. Another method of improving reliability without necessarily increasing processing time, is in the selection of the number of comparisons which must indicate a difference in gray scale in order to signify an alarm condition.

Moreover, it is not necessary to actually make all the planned comparisons if, for example, a sequence of early comparisons indicate a problem. For instance, if 2,458 comparisons are to be made, but only 90 comparisons indicating a difference are required to signal an alarm, then the processing can stop as soon as the 90th comparison indicating a difference is reached. This may occur at any time (i.e., on the 2,450th comparison or even on the 90th comparison, etc.). This manner of processing ensures reliability by preventing false alarms while minimizing processing time.

A First Physical Embodiment For Implementing The Method

In a first embodiment, the method of the invention may be implemented using a software driven system of a personal computer, such as an IBM-PC or equivalent. The software necessary to implement the system is included in the microfiche appendix. Also required in a video imaging interface for converting the analog video signal to digital signals for processing by the computer. In a preferred software driven embodiment, a Model DT2803 "Frame Grabber" was used as the video interface (available from Data Translation, Inc., 100 Locke Drive, Marlborough, Massachusetts 01752-1192). Of course, any commercially available equivalent video imaging interface could be used in lieu of the DT2803.

The DT2803 Frame Grabber is a single-board, microprocessor-based video imaging interface, suitable for use with the IBM personal computer series (IBM PC/AT/XT) and functionally IBM-compatible personal computers. This video interface provides real-time 6-bit digitization of an RS-170/RS-330/NTSC or CCIR/PAL compatible input signal. The DT2803 plugs into the PC backplane, and includes a video imaging input analog to digital converter and look-up tables, a 64 kilobyte frame-store memory, a video imaging output digital to analog converter and look-up tables, and microprocessor and control logic. For a more complete description of the capabilities and operation of the video imaging interface, the reader is referred to the User Manual for the DT2803 Low-Cost Frame Grabber, available as Document UM-03286A, copyright 1985, by Data Translation, Inc. This document is incorporated herein by reference as representative of the general state of the art with respect to video imaging interfaces.

The software included in the microfiche appendix is self-executing. After booting up the computer and loading the software, the user merely types the word "ALARMS" on the keyboard and then follows the self-explanatory menu driven instructions for setting the system sensitivity. If desired, the user can omit setting sensitivity levels, in which case the levels are automatically set by the software.

In the software driven embodiment, video camera 11 provides analog video signals to analog-to-digital converter 14 (DT2803), and the digital signals are then processed by the computer as previously described. When an abnormal or alarm condition is detected by the system, the software sounds an audible alarm through the internal speaker of the computer. With minor software modification, the system can also be programmed to sound an external alarm. For this purpose, an additional output port interface board is required, such as DT2801, also available from Data Translation, Inc.

Commercially available equivalent interfaces are also suitable.

A Second Physical Embodiment For Implementing The Method

FIGS. 4A-4E represent a second physical embodiment for implementing the method of the invention. This second embodiment is a hard or dedicated circuit designed specifically to implement the method of the invention.

Dedicated circuit 30 comprises I/O channel socket 49, which interconnects with an image processing interface board (e.g., DT2803, available from Data Translation, Inc., or equivalent) to accept digitized video signals which are stored in the 64 k random access memory (RAM) on the board. RAMs 35 and 36 are used to store the old frame image signals for later comparison with the new signals stored in memory on the interface board. RAMs 35 and 36 comprise 64 k of memory (43256-10L, or equivalent). Erasable programmable read-only memory (EPROM) 34 (27C256-20, or equivalent) is used to store the control program, similar to ALARM-U or ALARM-S used in the first embodiment. Central processing unit 32 (8088 or equivalent) controls the operations of the entire circuit. Latches 38, 39 and 40 (74LS373 or equivalent) are used to latch the address signals A0, A1, . . . A19, and send them to the appropriate chips as required. Bus transceiver 41 (74LS245 or equivalent) is used to transmit and receive data signals. Clock generator 31 (8284 or equivalent) produces CLK and OSC signals to synchronize the whole system. Programmable input/output interface chip 42 (8255A or equivalent) is used to input the manual sensitivity setting (using BCD switches 51 and 52 and octad driver 43 [74LS244 or equivalent]) and to output the sensitivity display (via 7 segment decoder/drivers 44 and 45 [74ls47 or equivalent] to displays 53 and 54, respectively) and to send out alarm signals AN1 and AN2 which can drive buzzer 55 via driver 46 (74563 or equivalent) or other alarm devices via relays RE1 and RE2 driven by driver 48 (74563 or equivalent). The reset switch is used to reset the relays and sensitivity switch $S_5$ is used to select either manual sensitivity (selected by BCD switches 51 or 52) or automatic sensitivity (selected by the software).

While the form of the apparatus used to implement the method of the invention as described herein constitutes a preferred embodiment of this invention, it is to be understood that the invention is not limited to this precise form of apparatus, and that changes may be made therein without departing from the scope of the invention as defined in the claims.

What is claimed is:

1. A visual image comparison method for automated video surveillance, comprising the steps of:
   a. obtaining a first digital representation of a first visual image, said first digital representation comprising a first plurality of pixels, wherein each pixel has a gray scale indicative of light intensity;
   b. obtaining a second digital representation of a second visual image, said second digital representation comprising a second plurality of pixels, wherein each pixel has a gray scale indicative of light intensity;
   c. selectively making a first predetermined number of first comparisons of corresponding remotely displaced pixels from said first and second digital representations to determine whether a difference in ambient light intensity exists between said first and second visual images, wherein said difference in ambient light intensity is defined to exist when a first percentage of said first predetermined number of first remotely displaced comparisons result in pixels having a difference in gray scale of a first predetermined amount; and,
   d. selectively making a second predetermined number of second comparisons of corresponding near neighboring pixels from said first and second digital representations if and only if no significant difference in ambient light intensity exists between said first and second visual images,
   e. and indicating an alarm condition when a second percentage of said second predetermined number of second near neighboring comparisons result in pixels having a difference in gray scale of a second predetermined amount.

2. A method as described in claim 1 wherein said second predetermined amount of difference in gray scale is defined as "K2" and K2 is determined automatically based on an average gray scale value of ambient light within the visual images being compared in said first comparison, wherein said average gray scale value is defined as "AGA", and wherein the average gray scale of the ambient is determined by adding all of the individual gray scales values (G's) of each considered pixel and then dividing this total by the number of pixels considered wherein K2 is determined according to Table I herebelow:

TABLE I

| AGA | 1 | 2 | 3 | 4 | 5 | 6 | 7 | 8 | 9 | 10 |
|---|---|---|---|---|---|---|---|---|---|---|
| K2 | 1 | 2 | 4 | 7 | 9 | 12 | 14 | 16 | 16 | 16 |
| AGA | 11 | 12 | 13 | 14 | 15 | 16 | 17 | 18 | 19 | 20 |
| K2 | 16 | 16 | 16 | 16 | 16 | 16 | 17 | 17 | 17 | 17 |
| AGA | 21 | 22 | 23 | 24 | 25 | 26 | 27 | 28 | 29 | 30 |
| K2 | 18 | 18 | 18 | 18 | 18 | 19 | 19 | 19 | 19 | 19 |
| AGA | 31 | 32 | 33 | 34 | 35 | 36 | 37 | 38 | 39 | 40 |
| K2 | 20 | 20 | 20 | 20 | 21 | 21 | 21 | 21 | 21 | 21 |
| AGA | 51 | 52 | 53 | 54 | 55 | 56 | 57 | 58 | 59 | 60 |
| K2 | 26 | 26 | 26 | 27 | 27 | 27 | 28 | 28 | 29 | 29 |
| AGA | 61 | 62 | 63 | | | | | | | |
| K2 | 30 | 31 | 32 | | | | | | | |

3. A visual comparison apparatus, comprising:
   a. means for obtaining a first digital representation of a first visual image, said first digital representation comprising a first plurality of pixels, wherein each pixel has a gray scale indicative of light intensity;
   b. means for obtaining a second digital representation of a second visual image, said second digital representation comprising a second plurality of pixels, wherein each pixel has a gray scale indicative of light intensity;
   c. means for selectively making a first predetermined number of first remotely displaced comparisons of corresponding pixels from said first and second digital representations to determine whether a difference in ambient light intensity exists between said first and second visual images, wherein said difference in ambient light intensity is defined to exist when a first percentage of said first predetermined number of first remotely displaced comparisons result in pixels having a difference in gray scale of a first predetermined amount; and,
   d. means for selectively making a second predetermined number of second comparisons of corresponding near neighboring pixels from said first and second digital representations if and only if no significant difference in ambient light intensity is found to exist, e. and indicating an alarm condition when a second percentage of said second predetermined number of second near neighboring comparisons result in pixels having a difference in gray scale of a second predetermined amount.

* * * * *